(12) United States Patent
Kobayashi et al.

(10) Patent No.: US 7,589,504 B2
(45) Date of Patent: Sep. 15, 2009

(54) CAPACITOR CHARGING APPARATUS FOR A STROBE DEVICE OF AN IMAGING DEVICE, SEMICONDUCTOR INTEGRATED CIRCUIT THEREFOR, AND CAPACITOR CHARGING-DISCHARGING SYSTEM FOR A STROBE DEVICE OF AN IMAGING DEVICE

(75) Inventors: Shinya Kobayashi, Kyoto (JP); Yoshifumi Yamamichi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 58 days.

(21) Appl. No.: 11/211,932

(22) Filed: Aug. 25, 2005

(65) Prior Publication Data

US 2006/0049806 A1 Mar. 9, 2006

(30) Foreign Application Priority Data

Sep. 9, 2004 (JP) .............................. 2004-263089

(51) Int. Cl.
*H02J 7/00* (2006.01)
(52) U.S. Cl. ...................... 320/166; 320/162; 323/238; 323/901
(58) Field of Classification Search ................. 320/135, 320/157, 159, 162, 166; 323/235, 238, 901
See application file for complete search history.

(56) References Cited

U.S. PATENT DOCUMENTS

| | | | | |
|---|---|---|---|---|
| 4,032,852 A * | 6/1977 | Hulls et al. ................. | 327/557 |
| 5,365,152 A * | 11/1994 | Ozawa et al. ................ | 315/291 |
| 5,896,026 A * | 4/1999 | Higgins ....................... | 320/166 |
| 6,411,064 B1 * | 6/2002 | Brink .......................... | 320/166 |
| 6,417,649 B1 * | 7/2002 | Brink .......................... | 320/166 |
| 6,518,733 B1 * | 2/2003 | Schenkel et al. ............ | 320/166 |
| 7,176,657 B2 * | 2/2007 | Lee et al. ..................... | 320/166 |
| 2003/0128013 A1 * | 7/2003 | Okamura et al. ............ | 320/166 |
| 2005/0174096 A1 * | 8/2005 | Yu ............................... | 320/166 |
| 2005/0285573 A1 * | 12/2005 | Cheng ......................... | 320/166 |

FOREIGN PATENT DOCUMENTS

JP 3497190 B 11/2003

* cited by examiner

*Primary Examiner*—Akm E Ullah
*Assistant Examiner*—Arun Williams
(74) *Attorney, Agent, or Firm*—Keating & Bennett, LLP

(57) ABSTRACT

In a capacitor charging apparatus, an on-time in which the primary circuit of a transformer is energized is continued until a primary current detection signal reaches a predetermined peak detection level, and an off-time in which the primary circuit is de-energized is clocked from the time when the primary current peak detection signal is received. At the end of the clocking, an ending signal is generated to terminate the off-time. The length of an off-time is inversely proportional to the charging voltage across the capacitor. The length of an off-time may be altered using a regulation resistor. Thus, an on-time and an associated off-time of the primary circuit of the transformer are controlled independently to optimize charging time and power efficiency of the charging.

27 Claims, 8 Drawing Sheets

CAPACITOR CHARGING APPARATUS FOR A STROBE DEVICE OF AN IMAGING DEVICE, SEMICONDUCTOR INTEGRATED CIRCUIT THEREFOR, AND CAPACITOR CHARGING-DISCHARGING SYSTEM FOR A STROBE DEVICE OF AN IMAGING DEVICE

FIELD OF THE INVENTION

This invention relates to a capacitor charging apparatus for charging a capacitor for use with a strobe apparatus for example, a semiconductor integrated circuit (IC) therefor, and a capacitor charging-discharging system utilizing the same.

BACKGROUND OF THE INVENTION

Imaging devices such as a film camera, a digital still camera, and a digital video camera utilize a strobe apparatus equipped with a capacitor to store chargeable and dischargeable energy.

A Japanese Patent No. 3497190 (Document 1) teaches a capacitor charging apparatus capable of securely charging a capacitor while maintaining a power supply voltage necessary for an imaging device without being influenced by the current supply capability of the power source of the imaging device.

The capacitor charging apparatus of Document 1 has a switch in the primary winding of a transformer receiving a power supply voltage. A capacitor connected to the secondary winding of the transformer is charged by the voltage generated in the secondary winding. The power supply voltage is detected by a voltage detection means during charging operation. In the event that the detected power supply voltage is higher than a predetermined voltage, the charging operation is continued until a predetermined charging voltage is obtained across the capacitor with the charging current kept at a predetermined peak level. On the other hand, in the event that the detected power supply voltage is less than a predetermined voltage during the operation, the charging operation is temporarily stopped until a sufficient power supply voltage is recovered.

Although Document 1 discloses means for controlling charging of a capacitor of a strobe apparatus in relation to the power supply voltage, it does not teach means for controlling the switch in the primary winding of a transformer.

However, in a capacitor charging apparatus for use with a strobe apparatus, it is important, from a point of charging time and power efficiency, to regulate timing of an on-time in which primary current is passed through the primary circuit of a transformer and timing of an associated off-time in which the primary current is shut off to charge the capacitor in the secondary circuit.

SUMMARY OF THE INVENTION

It is, therefore, an object of the invention to provide a capacitor charging apparatus capable of independently controlling the on-time and off-time of the primary circuit of a transformer, thereby allowing for optimization of the charging time and power efficiency of the apparatus.

It is another object of the invention to provide a semiconductor integrated circuit (IC) suitable for a capacitor charging apparatus, and a capacitor charging system utilizing such capacitor charging apparatus equipped with an inventive semiconductor IC.

Means for Carrying Out the Invention

In accordance with one aspect of the invention, there is provided a capacitor charging apparatus and semiconductor integrated circuit therefor, including a primary circuit receiving a power supply voltage and consisting of a switch means adapted to turn on in response to a switch drive signal and connected in series with the primary winding of a transformer, the transformer having a secondary winding connectable to a capacitor to be charged, the charging apparatus comprising:

primary current detection means for detecting a primary current detection signal generated in association with the primary current flowing through the primary winding when the switch means is turned on in response to the switch drive signal;

a primary current peak detection circuit adapted to generate a primary current peak detection signal for stopping the switch drive signal to turn off the switch means when the primary current detection signal has reached a predetermined peak detection level; and an off-time detection circuit adapted to start clocking an off-time of the primary circuit in response to the primary current peak detection signal and generate the switch drive signal when finishing clocking the off-time, thereby then turning on the switch means.

The off-time detection circuit is supplied with a first voltage associated with the charging voltage across the capacitor. The circuit is adapted to shorten the off-time as the charging voltage increases.

The off-time detection circuit may include an off-time adjusting resistor having a prescribed yet alterable resistance that determines the magnitude of the current flowing therethrough under the first voltage.

The off-time detection circuit may be fed a further predetermined voltage to determine the length of the off-time based on the higher one of the first voltage and a second voltage associated with the further predetermined voltage.

The off-time detection circuit may include an off-time adjusting resistor having a prescribed yet alterable resistance that determines the magnitude of current flowing therethrough under the higher one of the first and second voltages.

The off-time detection circuit may include a voltage limiting circuit for limiting the first voltage to a predetermined voltage.

The charging apparatus may include secondary current detection means for detecting the level of the secondary current that flows through the secondary winding, and a secondary current level detection circuit for detecting the secondary current falling below a predetermined secondary current detection level, whereby the off-time may be terminated based on the detection signal detected first of the detection signals sent from the secondary current level detection circuit and the off-time detection circuit.

The predetermined peak detection level can be the voltage associated with the power supply voltage, and the primary current peak detection circuit can be configured to alter the primary current peak level in accord with the power supply voltage.

The charging apparatus may further comprise a full-charge detection circuit receiving an input voltage associated with the charging voltage across the capacitor and outputting a full-charge detection signal when the input voltage exceeds a predetermined fully charged voltage, to thereby stop the switch drive signal and inform external devices that the capacitor is fully charged.

The capacitor charging apparatus may be configured to start pre-charging of the capacitor, without waiting for an externally applied start instruction, when the apparatus is fed a control voltage for controlling the apparatus, whereby the predetermined full-charge detection level is reduced by a predetermined factor (smaller than 1) so that the capacitor is pre-charged to a certain voltage lower than the full-charge voltage.

The charging apparatus may further comprise an over-voltage detection circuit adapted to receive an input voltage associated with the primary voltage (or the voltage across the primary winding) and generate an over-voltage detection signal to stop the switch drive signal when the input voltage exceeds a predetermined over-voltage detection level.

A capacitor charging-discharging system of the invention comprises:

a capacitor;

a capacitor charging apparatus as described above;

a strobe apparatus for discharging the capacitor to emit stroboscopic light; and a controller for monitoring and controlling the capacitor charging apparatus and the strobe apparatus.

In controlled charging of a capacitor according to the invention, on-time of the primary circuit of a transformer lasts until the primary current detection signal reaches a predetermined peak detection level. Clocking of an associated off-time is started when the primary current peak detection signal is received. When the clocking is finished, an ending signal is generated to end the off-time. Thus, the on-time and off-time can be controlled independently to optimize the charging time and the power efficiency.

Since the off-time detection circuit, receiving a first voltage associated with the charging voltage across the capacitor, shortens the length of the off-time as the charging voltage rises, the off-time is automatically set to an optimal length.

The off-time detection circuit may be adapted to determine the length of the off-time based on the higher one of two voltages: a first voltage associated with the charging voltage and a second voltage associated with a predetermined regulation input voltage (e.g. reference voltage) inputted thereto. Thus, the off-time is fixed to a prescribed maximum length while the charging voltage is low.

Since the off-time detection circuit limits the first voltage associated with the charging voltage to a prescribed limitary voltage by a voltage limitation circuit, the off-time may be fixed to a prescribed minimum length when the charging voltage becomes high.

The off-time detection circuit may have an off-time regulation resistor having a prescribed yet alterable resistance that determines the magnitude of current flowing therethrough under the voltage applied thereto. Thus, based on said predetermined voltage, the length of the off-time can be altered independently of the charging voltage. In this way, average primary current can be altered in user's preference for a charging-efficiency priority mode to a charging-time priority mode or the other way around. It should be appreciated that the off-time can be externally altered by means of an external off-time regulation resistor for example, so that the off-time can be regulated even after the completion of the specification of the IC.

The predetermined peak detection level can be the voltage associated with the power supply voltage, and the primary current peak detection circuit can be configured to alter the primary current peak level in accord with the power supply voltage. Thus, when the power supply voltage supplied from, for example, a battery has lowered, the primary current peak level is lowered accordingly, thereby preventing a shut down of the system due to battery drain.

When the capacitor is fully charged, the switch drive signal is stopped and the fully charged status of the capacitor can be informed to external devices such as a CPU by generating a full-charge detection signal, as stated above, which is useful in controlling the discharge of the capacitor.

The invention enables pre-charging of the capacitor, without waiting for an externally applied start charging signal from the CPU for example, when a control voltage VCC for controlling the charging apparatus and/or the IC therefor is supplied, so that the capacitor is pre-charged based on a 'reduced' full-charge detection level, the reduced full-charge detection level being a fraction (smaller than 1) of the full-charge detection level. Because of this, time for fully charging the capacitor is shortened in the sense that the capacitor has been already charged to a predetermined voltage lower than the full charging voltage and only needs be charged, upon receipt of an external start charging signal, from that voltage to the full-charge voltage in a shorter time.

It will be recalled that an over-voltage detection signal is generated to stop the switch drive signal when the voltage indicative of the primary voltage Vpri exceeds a predetermined over-voltage detection level. Thus, the capacitor charging apparatus will be automatically stopped if a malfunction such as open circuit takes place in the secondary circuit.

The capacitor charging apparatus may also be provided with a secondary current level detection circuit for detecting the condition or status in which the secondary current has dropped below a predetermined level. In that event, the off-time is terminated based on the detection signal detected first of the detection signals received from the secondary current level detection circuit and the off-time detection circuit. Thus, the off-time is controllable based not only on the charging voltage, but also on the secondary current.

DETAILED DESCRIPTION OF THE PREFERRED EMBODIMENT

A capacitor charging apparatus, a semiconductor IC therefor, and a capacitor charging-discharging system according to the invention will now be described in detail by way of example with reference to the accompanying drawings.

Figure 1:
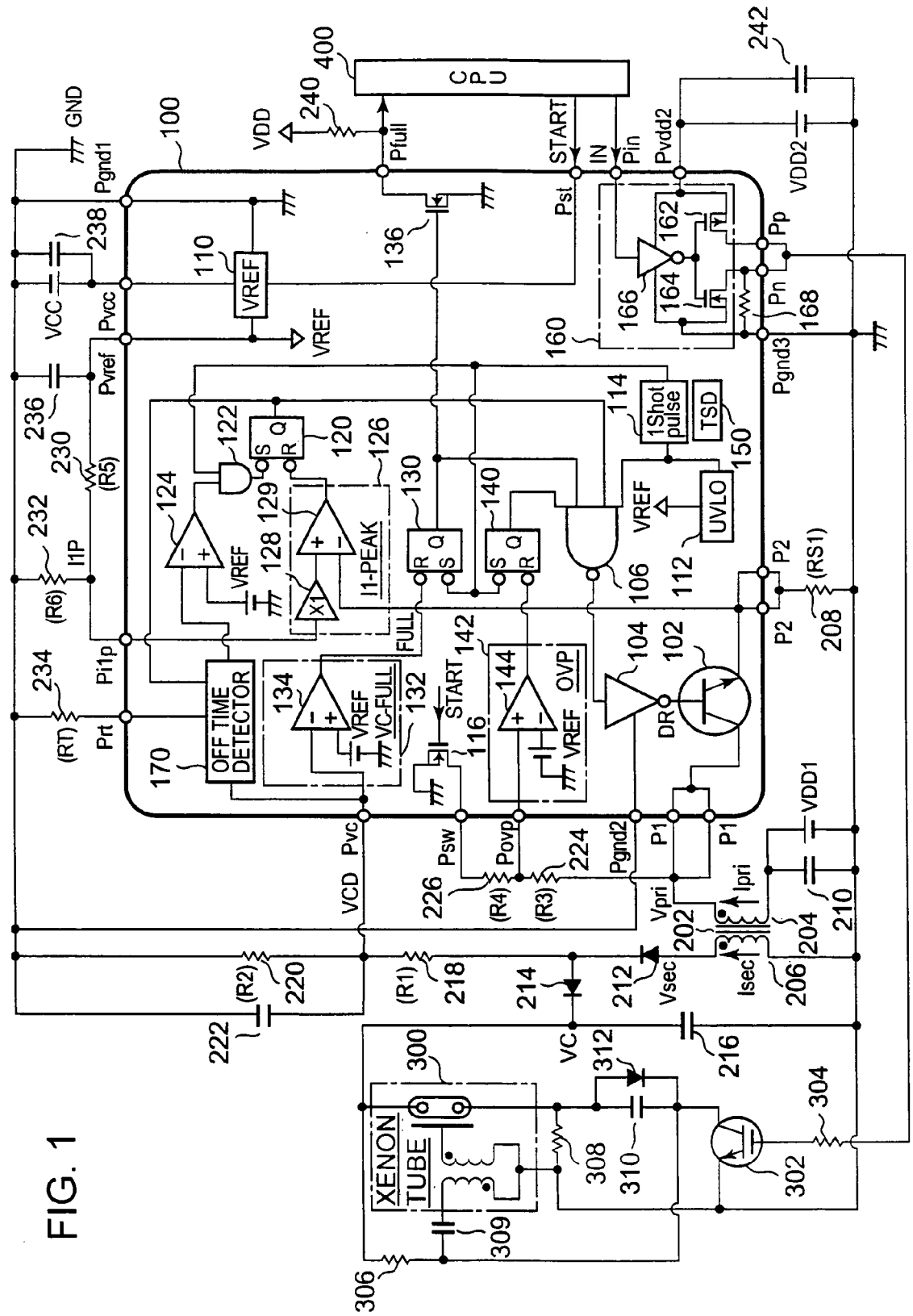
FIG. 1 shows an overall arrangement of a first embodiment of the invention.

Referring to FIG. 1, there is shown an overall circuit arrangement of a capacitor charging-discharging system according to a first embodiment of the invention. As shown, the capacitor charging-discharging system is equipped with a controller having:

a main capacitor 216 for storing and discharging electricity;

a capacitor charging apparatus for charging the main capacitor 216;

a strobe apparatus for emitting light when the main capacitor 216 is discharged; and a CPU 400 for monitoring and controlling the capacitor charging apparatus and the strobe apparatus.

It is seen in FIG. 1 that the capacitor charging apparatus has a semiconductor integrated circuit (IC) 100 for controlling charging of the capacitor. The IC 100 will be first described in detail.

In the IC 100, there is provided between a terminal P1 and a terminal P2 a switching means 102 that can be turned on by a switch drive signal DR. In the example shown herein, the switching means 102 is an NPN-type bipolar transistor (referred to as NPN transistor). The switching means 102 can be replaced by another type of transistor such as a PNP-type bipolar transistor (referred to as PNP transistor) or MOS-type FET (referred to as MOS transistor). Since a comparatively large current flows through the two terminals P1 and P2, each of these terminals is made up of two terminal pieces connected in parallel.

The switching means 102 is provided at the base thereof with a switch drive signal DR from a driver 104. The driver 104 is supplied with the output of a NAND circuit 106. The NAND circuit 106 provides the output at different levels depending on the drive conditions imposed on the NAND circuit. The driver 104 is driven by the control voltage VCC available between a terminal Pvcc and terminals Pgnd1 and Pgnd2, as are other circuits. Reference numeral 238 indicates a capacitor.

A reference voltage generating circuit 110 is supplied with the control voltage Vcc, and, upon receipt of an external "start charging" signal START via a terminal Pst, pulls up the level of a reference voltage VREF to a predetermined level. In addition, a switch 116 in the form of an N-type MOS transistor (NMOS transistor) provided between a terminal Psw and the ground is turned on by the start charging signal START.

The reference voltage VREF is also supplied to other components of the IC 100 and to a low-voltage lockout circuit 112 as well. As the reference voltage VREF acquires the predetermined voltage level, the low-voltage lockout circuit 112 feeds a signal having a high (H) level to a NAND circuit 106 and a one-shot pulse generating circuit 114. The one-shot pulse generating circuit 114 generates a single falling pulse at the rising edge of the inputted H level signal.

This single pulse is inputted into the set terminal S of a latch circuit (R-S flip-flop circuit) 120 via an AND circuit 122 and into the respective setting terminals S of the latch circuits 130 and 140, which causes the latch circuits 120, 130, and 140 to be set to output H-level output signals at the respective output terminals Q, which signals are inputted into a NAND circuit 106. These latch circuits 120-140 are latched at a falling edge of the signal received.

A primary current peak detection circuit 126 is fed at the terminal Pi1p thereof with a voltage that is obtained by dividing the reference voltage VREF. The fed voltage is multiplied by a predetermined factor (which is 1 in the example shown) by means of a coefficient unit 128 to define a predetermined peak detection level. The comparator 129 compares a given peak detection level with the predetermined primary current detection signal received from the terminal P2, and generates a primary current peak detection signal when the primary current detection signal reaches the predetermined peak detection level.

This primary current peak detection signal is inputted into the reset terminal R of the latch circuit 120, to reset the latch circuit 120. The output signal of the latch circuit 120 is inputted into an off-time detector 170.

Together with a comparator 124, the off-time detector 170 constitutes the off-time detection circuit. The off-time detection circuit starts clocking an off-time Toff when the latch circuit 120 is reset by the primary current peak detection signal. When off-time Toff is clocked up, the output of the comparator 124 is inverted to generate an off-time end signal, which resets the latch circuit 120 again via AND circuit 122. The length of off-time Toff is appropriately determined by the voltage associated with the charging voltage VC across the main capacitor 216 inputted from a terminal Pvc and by the resistance RT of an off-time setting resistor 234 connected to the terminal Prt. More particularly, the larger the charging voltage VC is, the shorter will be off-time Toff, and the larger the resistance RT is, the longer will be off-time Toff.

The full-charge detection circuit 132 has a comparator 134 adapted to compare the reference voltage VREF with the voltage associated with the charging voltage VC across the main capacitor 216 inputted via the terminal Pvc. When the voltage associated with the charging voltage VC has reached the reference voltage VREF, the full-charge detection circuit 132 outputs a full-charge detection signal FULL. This full-charge detection signal FULL resets the latch circuit 130 and stops the switch drive signal DR. As the latch circuit 130 is reset, an N-type MOS transistor 136 is turned off to pull up the voltage at a terminal Pfull by means of a pull-up resistor 240, thereby informing an external CPU 400 of the fact that the full-charge detection signal FULL has been generated.

The voltage obtained by dividing the primary voltage of a transformer 202 appears at the terminal P1, which is inputted to the over-voltage detection circuit 142 via a terminal Povp. In a comparator 144 of the over-voltage detection circuit 142, the inputted voltage is compared with a reference voltage VREF serving as the predetermined over-voltage detection level. When the inputted voltage exceeds the reverence voltage VREF, an over-voltage detection signal is generated. This over-voltage detection signal resets the latch circuit 140 to stop the switch drive signal DR.

A protective thermal shutdown circuit 150 is provided to monitor the temperature of the IC 100. The circuit stops the operation of the IC 150 when the temperature exceeds a predetermined level.

A strobe drive circuit 160 outputs a strobe drive signal from terminals Pp and Pn in response to an input signal IN supplied from an external CPU 400 via a terminal Pin. The strobe drive circuit 160 includes a strobe driver 166 and an inverter switch circuit formed of a P-type MOS transistor 162, an N-type MOS transistor 164, and a resistor 168. This switch circuit is driven by the output of the driver 166. The drive circuit 160 is supplied with a strobe control voltage VDD2 from terminals Pvdd2 and Pgnd3. Reference numeral 242 indicates a capacitor.

The structure of the capacitor charging apparatus, excluding the IC 100, will now be described in more detail.

The transformer 202 has a primary winding 204 and a secondary winding 206. Connected in series to the primary winding 204 are a switching means 102, a current detection resistor 208 (of resistance RS1) serving as a primary current detection means, and a power supply voltage VDD1, together forming a closed loop. One end (opposite to the end connected to the terminal P2) of the current detection resistor 208 is grounded. A capacitor 210 is connected in parallel to the power supply voltage VDD1.

Connected in series to one end of the secondary winding 206 is a main capacitor 216 via diodes 212 and 214 such that the capacitor is charged in one direction. The other end of the secondary winding 206 and the other end of the main capacitor 216 are grounded.

When the switching means 102 is turned on, primary current Ipri will flow through the primary winding 204, switching means 102, and current detection resistor 208 (of resistance RS1). As a consequence, a voltage (=Ipri×RS1) proportional to primary current Ipri is generated at the terminal P2, which voltage serves as a primary current detection signal. As the switching means 102 is turned off, the main capacitor 216 is charged by the secondary current Isec flowing through the secondary winding 206. Repeated on-off operation of the switching means 102 causes the charging voltage VC of the main capacitor 216 to rise.

The charging voltage VC is divided by resistors 218 and 220 (of resistances R1 and R2, respectively), to obtain a divided voltage VCD. The divided voltage VCD is supplied to a full-charge detection circuit 132 and an off-time detector 170 via the terminal Pvc. A capacitor 222 is provided to hold the divided voltage VCD.

The primary voltage Vpri across the primary winding 204 is divided by resistors 224 and 226 (of resistances R3 and R4, respectively), with the divided voltage supplied to the overvoltage detection circuit 142 via a terminal Povp.

The voltage appearing at a terminal Pvref is divided by resistors 230 and 232 (of resistances R5 and R6, respectively), to provide a predetermined peak detection level I1P for determining the peak level of the primary current Ipri. The predetermined peak detection level I1$p$ is fed to the primary current peak detection circuit 126 via the terminal Pi1$p$. A capacitor 236 is connected in parallel to the series circuit of resistors 230 and 232.

Next, an inventive strobe apparatus will be described below. The strobe apparatus has a xenon pipe 300, a resistor 306 which is ancillary to the xenon pipe 300, a resistor 308, capacitors 309 and 310, a diode 312, and an insulated gate type bipolar transistor (IGBT) 302 for controlling light emission of the xenon pipe 300.

The IGBT 302 is driven by a strobe drive signal supplied from the strobe drive circuit 160 via a resistor 304. When IGBT 302 is turned on, the main capacitor 216 discharges through the xenon pipe 300 and IGBT 302, causing the xenon pipe 300 to emit light.

The CPU 400 is a controller for controlling the entire transistor IC 100. The CPU 400 feeds a start signal START to the IC 100, from which a full-charge detection signal FULL is returned. The CPU 400 also provides the IC 100 with an input signal IN for generating a strobe drive signal.

Figure 2:
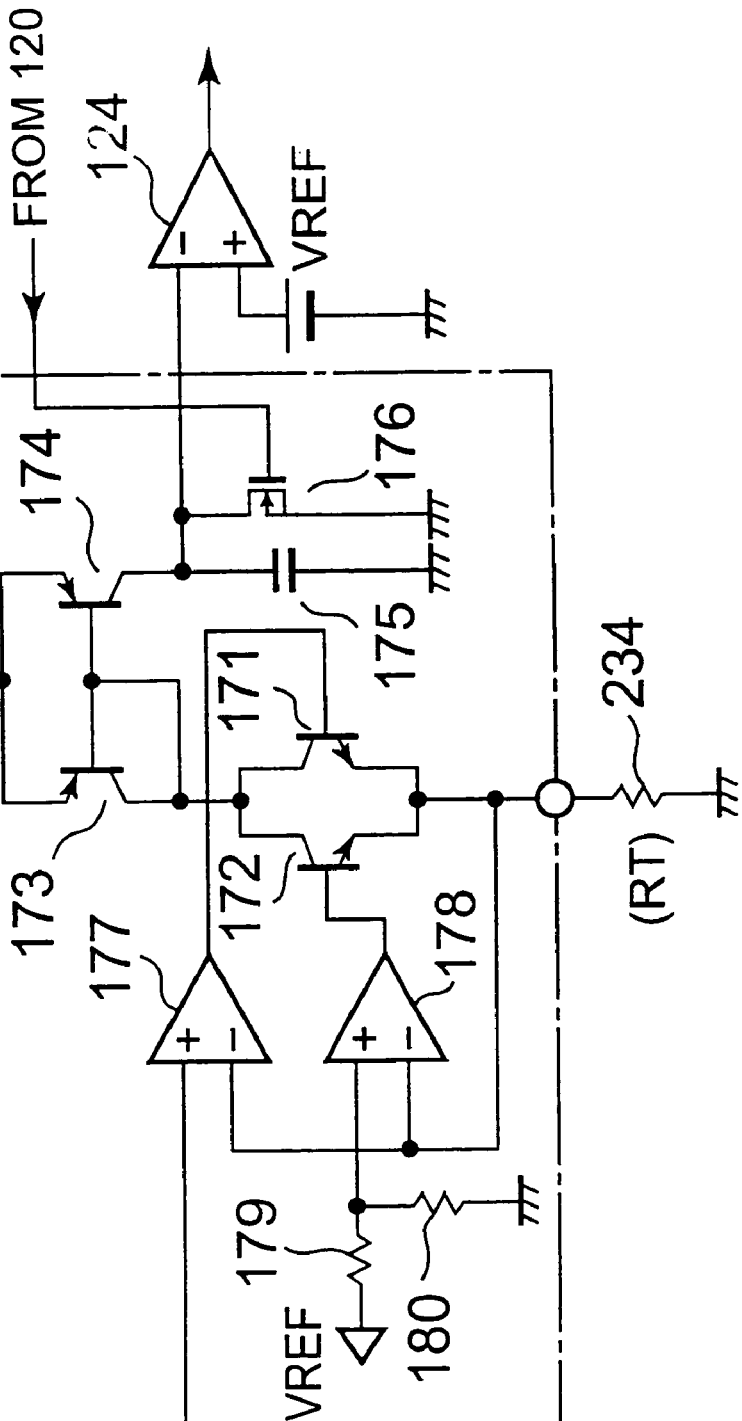
FIG. 2 shows an arrangement of an off-time detection circuit of FIG. 1.

Referring to FIG. 2, there is shown an arrangement of the off-time detector 170, along with the off-time setting resistor 234 and comparator 124.

As shown in FIG. 2, connected in series between the control voltage VCC and the ground are a PNP transistor 173 having its base and collector connected to each other, parallelly connected NPN transistors 171 and 172, and the off-time setting resistor 234.

A voltage associated with the charging voltage VC across the capacitor is supplied from the terminal Pvc to the non-inverting (+) input terminal of an operational amplifier 177, and the voltage drop across the off-time setting resistor 234 is supplied to the inverting input terminal. The output terminal of the operational amplifier 177 is connected to the base of the NPN transistor 171.

A voltage obtained by dividing the reference voltage VREF by resistors 179 and 180 is inputted, as "the voltage associated with a predetermined input voltage", into the non-inverting (+) terminal of an operational amplifier 178, while the voltage drop across the off-time setting resistor 234 is inputted into the inverting (−) terminal of the operational amplifier 178. The output terminal of the operational amplifier 178 is connected to the base of the NPN transistor 172.

The voltage drop across the off-time setting resistor 234 depends on the higher one of the input voltages supplied to the operational amplifiers 177 and 178.

Off-time Toff of the primary circuit is implemented as follows. It is noted that the current that flows through the PNP transistor 173 is determined by the higher one of the input voltages fed to the operational amplifiers 177 and 178 and the resistance RT of the off-time setting resistor 234. A capacitor 175 is charged by the current flowing through a PNP transistor 174, which is proportional to the current flowing through the PNP transistor 173. When the charging voltage across the capacitor 175 reaches the reference voltage VREF, an off-time termination signal is outputted from the comparator 124 to terminate off-time Toff. Thus, off-time Toff is shortened for a higher input voltage, and extended for a larger resistance RT.

As a consequence, off-time Toff is determined by the higher one of the voltages inputted into the operational amplifiers 177 and 178 and by the resistance RT of the off-time setting resistor 234.

The PNP transistor 174 having its base connected to the base of the PNP transistor 173 and the capacitor 175 connected in series to the transistor 175 are connected between the control voltage VCC and the ground. Connected in parallel to the capacitor 175 is an NMOS transistor 176 that can be turned on by the output of the latch circuit 120 supplied to the gate of the transistor 176. The PNP transistors 173 and 174 together constitute a current-mirror configuration.

Figure 3:
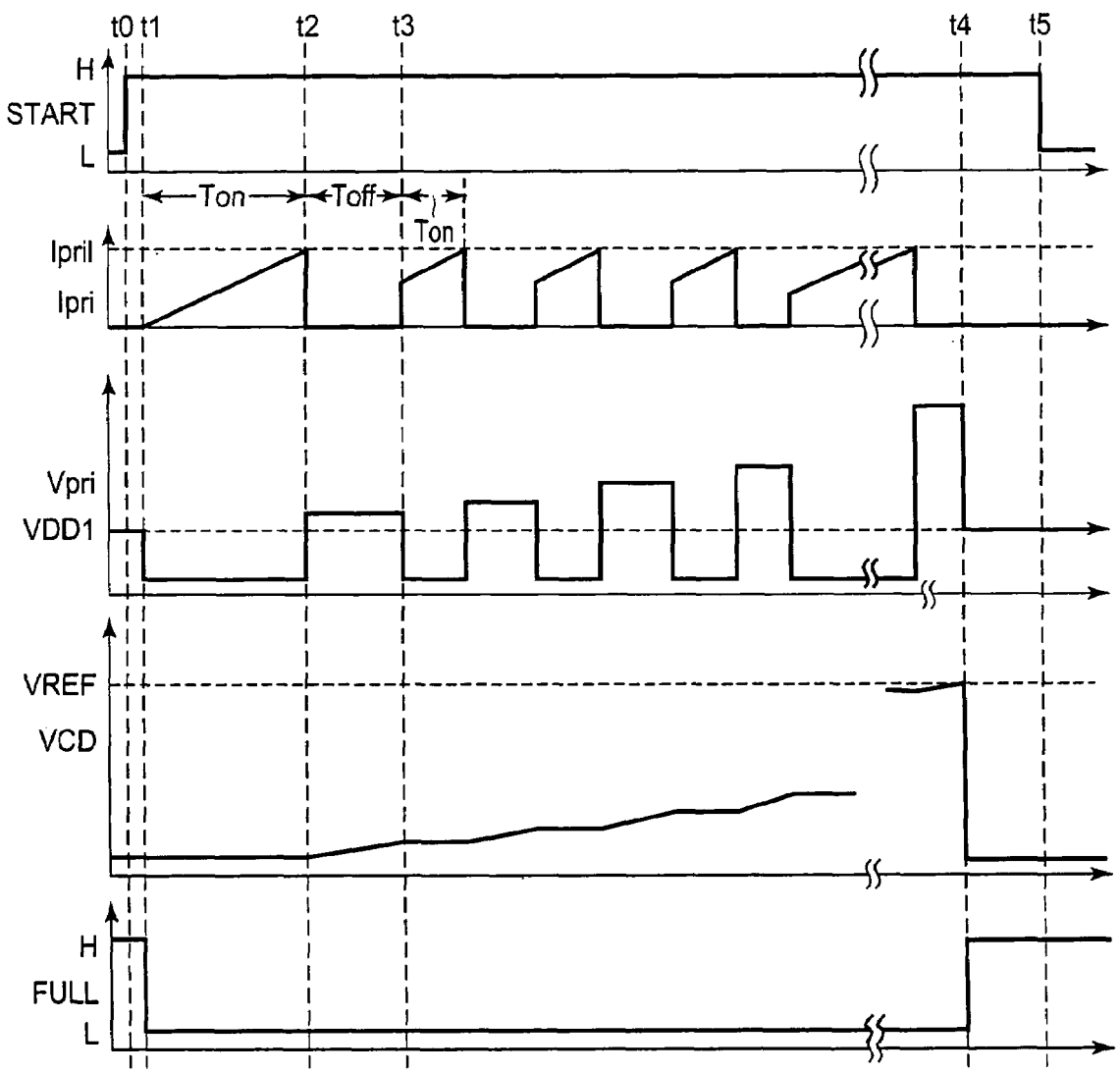
FIG. 3 is a timing diagram for the circuit shown in FIG. 1.

Operations of the capacitor charging apparatus and the capacitor charging-discharging system of FIGS. 1 and 2 will be now described, referring to a timing diagram in FIG. 3.

Suppose that a start charging signal START is supplied from the reference voltage generating circuit 110 to the CPU 400 at time t0. In response to the start charging signal START, the reference voltage generating circuit 110 pulls up the reference voltage VREF to a predetermined level based on the control voltage VCC.

The low-voltage lockout circuit 112 will detect the rise of the reference voltage VREF, and provides a detection signal indicative of the rise to the NAND circuit 106 and one-shot pulse generating circuit 114. Upon receipt of the detection signal from the low-voltage lockout circuit 112, the one-shot pulse generating circuit 114 generates a one-shot pulse that falls only for a short period of time to reset the latch circuits 120, 130, and 140, which causes the respective latch circuits to output, from their output terminals Q, H level signals to be inputted into the NAND circuit 106.

Thus, all of the four inputs to the NAND circuit 106 are pulled up to H level, which results in a switch drive signal DR to turn on the switching means 102, at time t1 say. This in turn causes the primary current Ipri to increase from zero level. As a consequence, the voltage at the terminal P1, or the terminal voltage Vpri across the primary winding, drops from the initially applied power supply voltage VDD to substantially zero voltage. More accurately, a voltage that amounts to the voltage drops across the switching means 102 and the current detection resistor 208 remains at the terminal P1.

After the switching means 102 turns on, the primary current Ipri increases with a rate determined by the primary inductance of the transformer 202 and the power supply voltage VDD1. The primary current detection signal increases with a rate determined by the product of the resistance of the current detection resistor 208 and the primary current Ipri. On-time Ton begins at time t1.

As the primary current Ipri reaches the predetermined peak detection level Ipri1 at time t2 say, the latch circuit 120 is reset to stop the switch drive signal DR and turn off the switching means 102. On-time Ton is defined to be a period from t1 to t2. Since the output signal issued from the (reset) latch circuit 120 is inputted into the off-time detector 170 at time t2, clocking of off-time Toff is started at time t2.

In off-time Toff, electromagnetic energy, or magnetic flux, stored in the core of the transformer 202 is liberated to the secondary winding 206, generating a secondary voltage Vsec across the secondary winding 206, which results in secondary current Isec that charges the main capacitor 216. Thus, the charging voltage VC gradually builds up across the capacitor during off-time Toff.

In the off-time detector 170, the length of off-time Toff is determined by the resistance RT of the off-time setting resistor 234 and by the higher one of the voltages inputted into the operational amplifier 177 (i.e., charging voltage VC across the capacitor) and the voltage inputted into the operational amplifier 178 (i.e., the voltage associated with the predetermined reference voltage VREF).

At the beginning of the charging, off-time Toff is determined based on the voltage associated with the reference voltage VREF, since the charging voltage VC is initially low. Then off-time Toff has a definite length as determined by the voltage associated with the reference voltage VREF and the resistance RT of the off-time setting resistor 234. Thus, off-time Toff is fixed to a certain maximum length while the charging voltage VC remains low.

As the output voltage of the off-time detector 170 (or the voltage across the capacitor 175) reaches the reference voltage VREF of the comparator 124 (at time t3), the latch circuit 120 is set to generate a switch drive signal DR, which turns on the switching means 102. This starts up the next on-time, causing the capacitor 175 to discharge.

Through repetition of such turn-on and -off operation, the charging voltage VC gradually builds up.

As the main capacitor 216 is charged on, the voltage inputted to the operational amplifier 177 (i.e., the charging voltage VC across the capacitor) eventually exceeds the voltage inputted to the operational amplifier 178 (i.e., the voltage associated with the predetermined reference voltage VREF). Then, the length of off-time Toff is regulated by the charging voltage VC across the capacitor and the resistance RT of the off-time setting resistor 234.

If off-time Toff is shortened, average primary current Ipri will be increased, which will in turn shorten the charging time for the main capacitor 216. Conversely, if a longer off-time Toff is set, average primary current Ipri will become smaller, which will, however, result in a longer flow time of the secondary current Isec, allowing for efficient utilization of the energy stored in the transformer 202. Therefore, one may choose either a charging-time priority mode obtained by setting up a shorter off-time Toff or a charging-efficiency priority mode obtained by setting up a longer off-time Toff.

Since the charging voltage VC increases with time, off-time Toff gradually decreases with the charging voltage VC. In other words, off-time Toff is inversely proportional to the charging voltage VC. Efficient charging of the capacitor 216 can be attained by taking advantage of this inverse proportionality between off-time Toff and the charging voltage VC, since charging time for the main capacitor 216 can be shortened by increasing the charging voltage VC.

In this way, on-time Ton and off-time Toff can be controlled independently. Additionally, off-time Toff is shortened as the charging voltage VC increases. Thus, off-time Toff is automatically set to an appropriate length.

As the main capacitor 216 is charged to the full-charge voltage VC (at time t4), a full-charge detection signal FULL is generated by the full-charge detection circuit 132 to reset the latch circuit 130. With the latch circuit 130 being reset, the switch drive signal DR is stopped to turn off the switching means 102. At the same time, the CPU 400 is informed that the capacitor is fully charged. Upon receipt of the information, the CPU 400 pulls down the start charging signal START to low (L) level to stop charging of the capacity. Although voltage VCD obtained by dividing the charging voltage VC is shown in FIG. 3 to drop instantly to a low level, in actuality the voltage decreases with a finite rate that depends on the discharging time constant.

In the event that an anomalous high voltage occurs in the primary circuit due to, for example, an open circuit failure that has occurred in the secondary circuit of the transformer 202, an over-voltage detection signal is generated by an over-voltage detection circuit 142 to reset the latch circuit 140. Resetting the latch circuit 140 will cause the switch drive signal DR to be stopped, and the switching means 102 to be turned off. The charging apparatus may be configured to display an alarm indicating that the switching drive signal DR was stopped on account of an anomaly such as an over-voltage The alarm may be sent to the CPU 400, as needed.

Light emission by the strobe apparatus is carried out by enabling the IGBT 302. This can be done by sending a strobe drive signal generated by the strobe drive circuit 160 upon receipt of an input signal IN from the CPU 400. Thus, light emission from the strobe apparatus and charging of the main capacitor 216 are independently controlled. It should be noted, however, that the light emission and charging of the main capacitor are integrally controlled by the CPU 400 in an appropriate manner.

Figure 4:
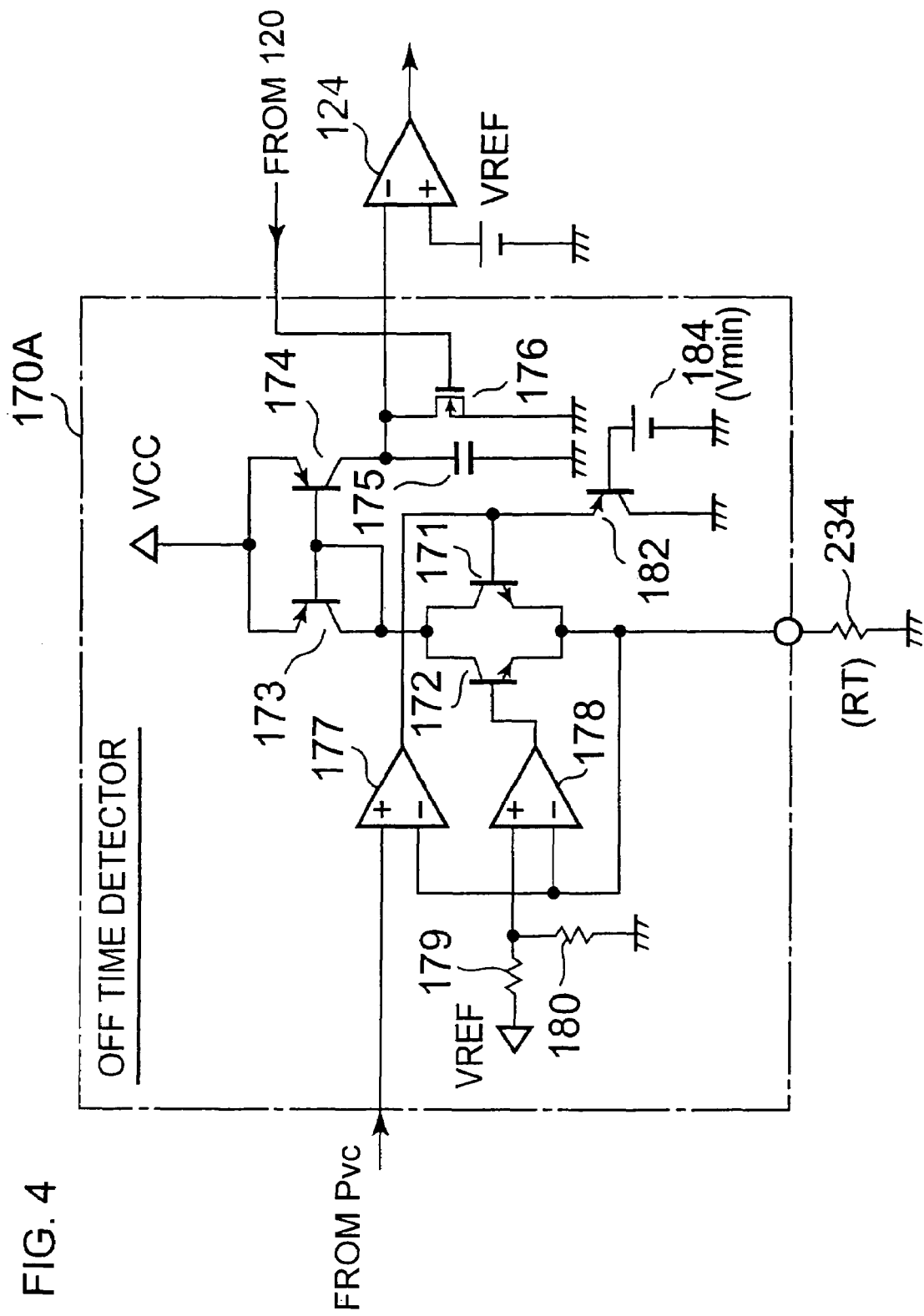
FIG. 4 shows an arrangement of an off-time detection circuit according to a second embodiment of the invention.

Referring to FIG. 4, there is shown an arrangement of the off-time detector 170 in accordance with a second embodiment of the invention. This off-time detector 170 has a voltage limiting circuit for setting a predetermined limitary voltage Vmin associated with the charging voltage VC required for setting up a minimum off-time Toff. As an example, the voltage limiting circuit may be formed of an NPN transistor 171 having a base receiving a voltage associated with the charging voltage VC and connected to the ground via a PNP transistor 182. The base voltage of the PNP transistor 182 is set to the limitary voltage Vmin.

Thus, the off-time detection circuit can set up the minimum off-time as determined by the limitary voltage Vmin when the charging voltage VC exceeds a predetermined level.

Figure 5:
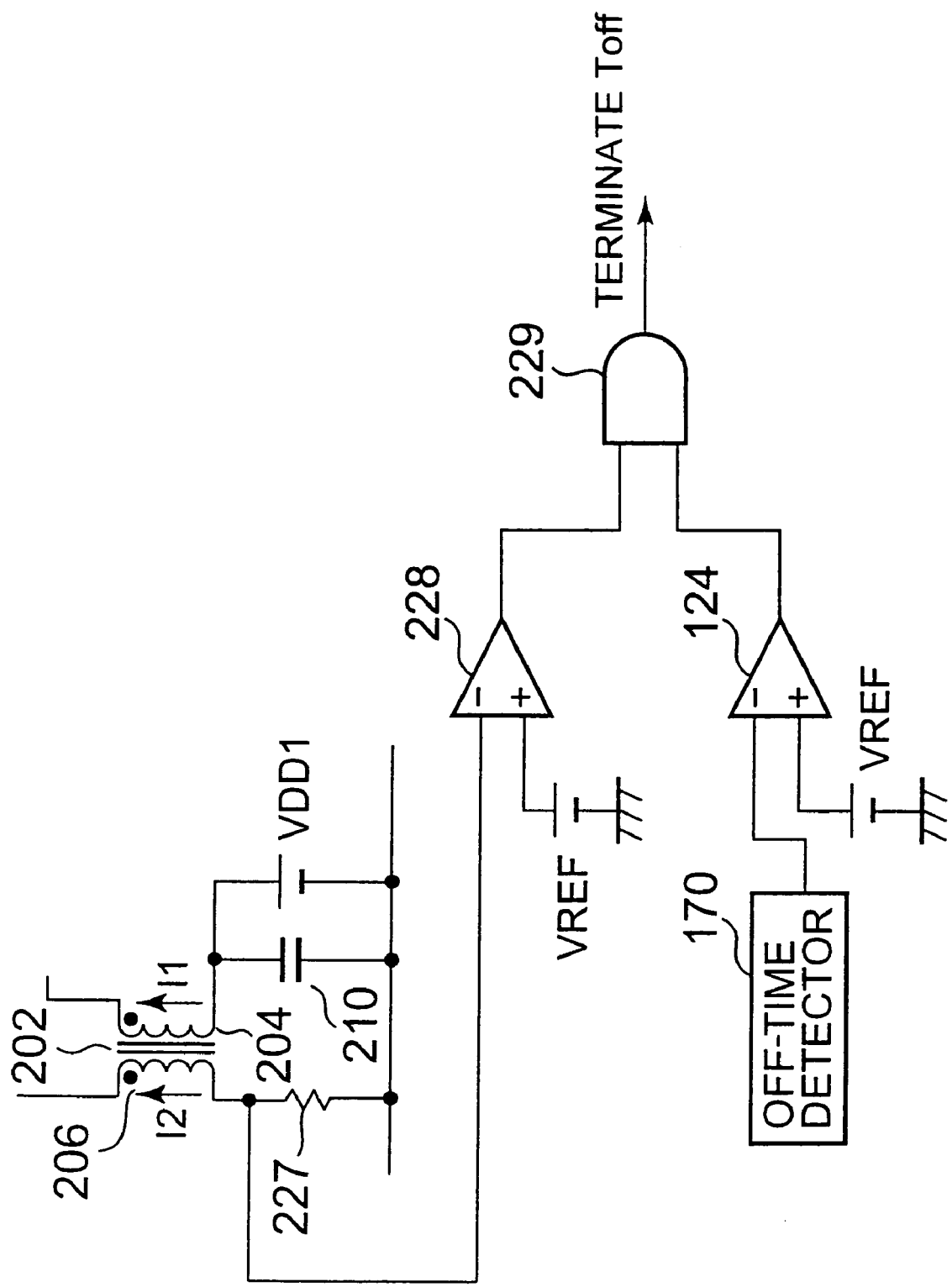
FIG. 5 shows an arrangement of an off-time detection circuit according to a third embodiment of the invention.

Referring to FIG. 5, there is shown an arrangement of an off-time detection circuit in accordance with a third embodiment of the invention. As compared with the first embodiment of FIG. 1, this off-time detection circuit has a further a resistor 227 serving as a secondary current level determination means for determining the level of the secondary current Isec flowing through the secondary winding 206, and a comparator 228 adapted to detect that the secondary current Isec has fallen below a predetermined secondary current detection level. Off-time Toff is terminated based on the detection signal detected first of the detection signals received from the comparator 228 and the off-time detection circuit (consisting of the off-time detector 170 and the comparator 124).

Thus, off-time Toff can be controlled based not only on the charging voltage VC, but also on the secondary current Isec.

Figure 6:
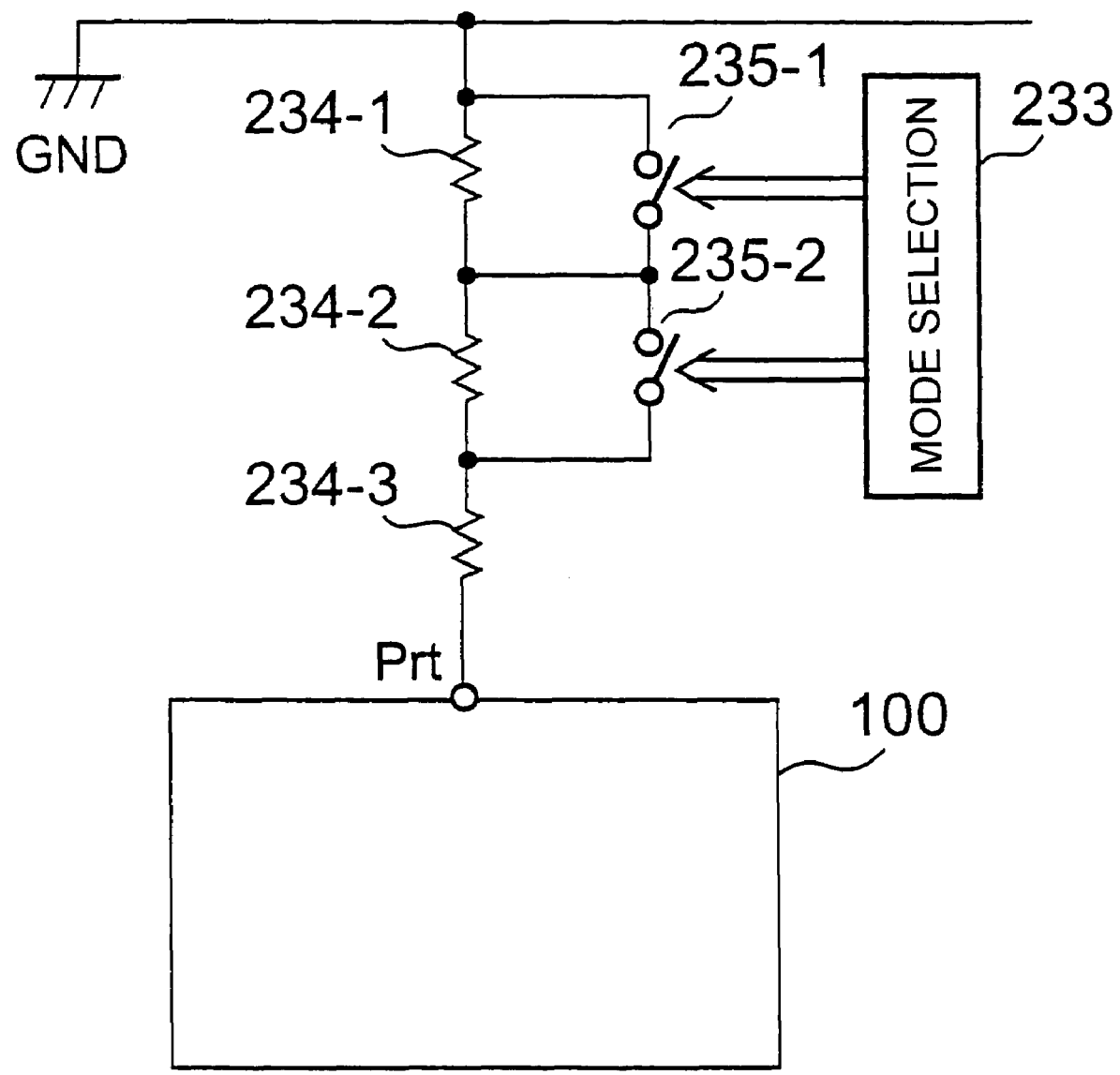
FIG. 6 shows an arrangement of an off-time detection circuit according to a fourth embodiment of the invention.

Referring to FIG. 6, there is shown an arrangement of an off-time detection circuit in accordance with a fourth embodiment of the invention. This off-time detection circuit is capable of altering the resistance RT of the off-time setting resistor 234 in order to control the current flowing through it under the voltage applied thereto.

As an example, the off-time setting resistor 234 is formed of three resistors 234-1, 234-2, and 234-3, two of which (e.g. 234-1 and 234-2) are connected to switches 235-1 and 235-2, respectively, as shown, such that either one of the switches 235-1 and 235-2 can be turned on selectively by a mode selection circuit 233. In this way, the resistance of the off-time setting resistor 234 may be altered. It should be noted that the off-time setting resistor 234 is provided outside the IC 100, so that it can be changed by resistor(s) having different resistance(s).

In this way, off-time Toff can be altered independently of the charging voltage VC. Thus, average primary current Ipri can be changed according to user's preference to an efficient-charging priority mode and charging-time priority mode. Moreover, since average primary current Ipri can be changed outside the IC 100, off-time Toff can be regulated even after the specification of IC 100 was completed.

Figure 7:
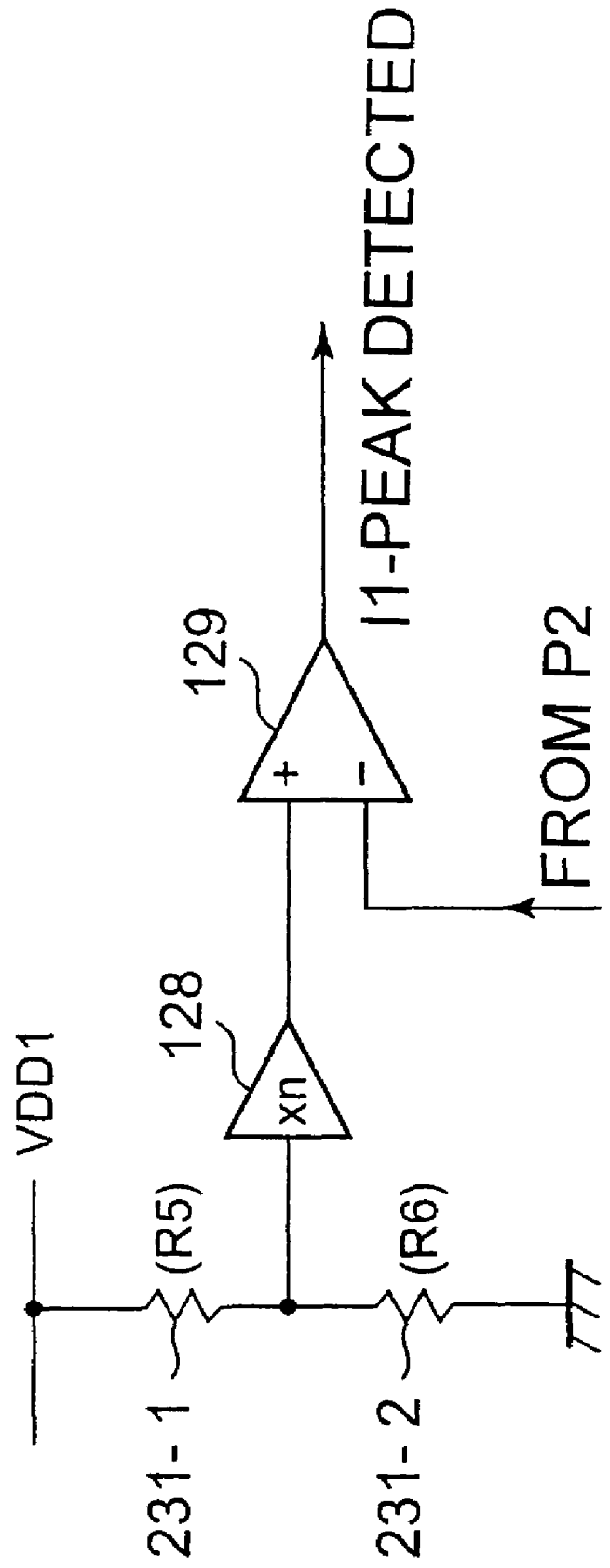
FIG. 7 shows an arrangement of a primary current peak level detection circuit according to a fifth embodiment of the invention.

Referring to FIG. 7, there is shown an arrangement of a primary current peak level detection means in accordance with a fifth embodiment of the invention. In this primary current peak level detection means, a predetermined peak detection level is set in accord with the power supply voltage VDD1, so that the primary current peak level can be altered in accord with the power supply voltage VDD1. Specifically, the predetermined peak detection level is obtained by dividing the power supply voltage VDD1 by voltage dividing resistors 231-1 and 231-2.

It would be appreciated that if the power supply voltage VDD1 of a battery, for example, has lowered due to battery drain for example, the primary current peak level Ipri1 is lowered correspondingly, so that it is then possible to delay shut down of the system for a certain period of time.

Figure 8:
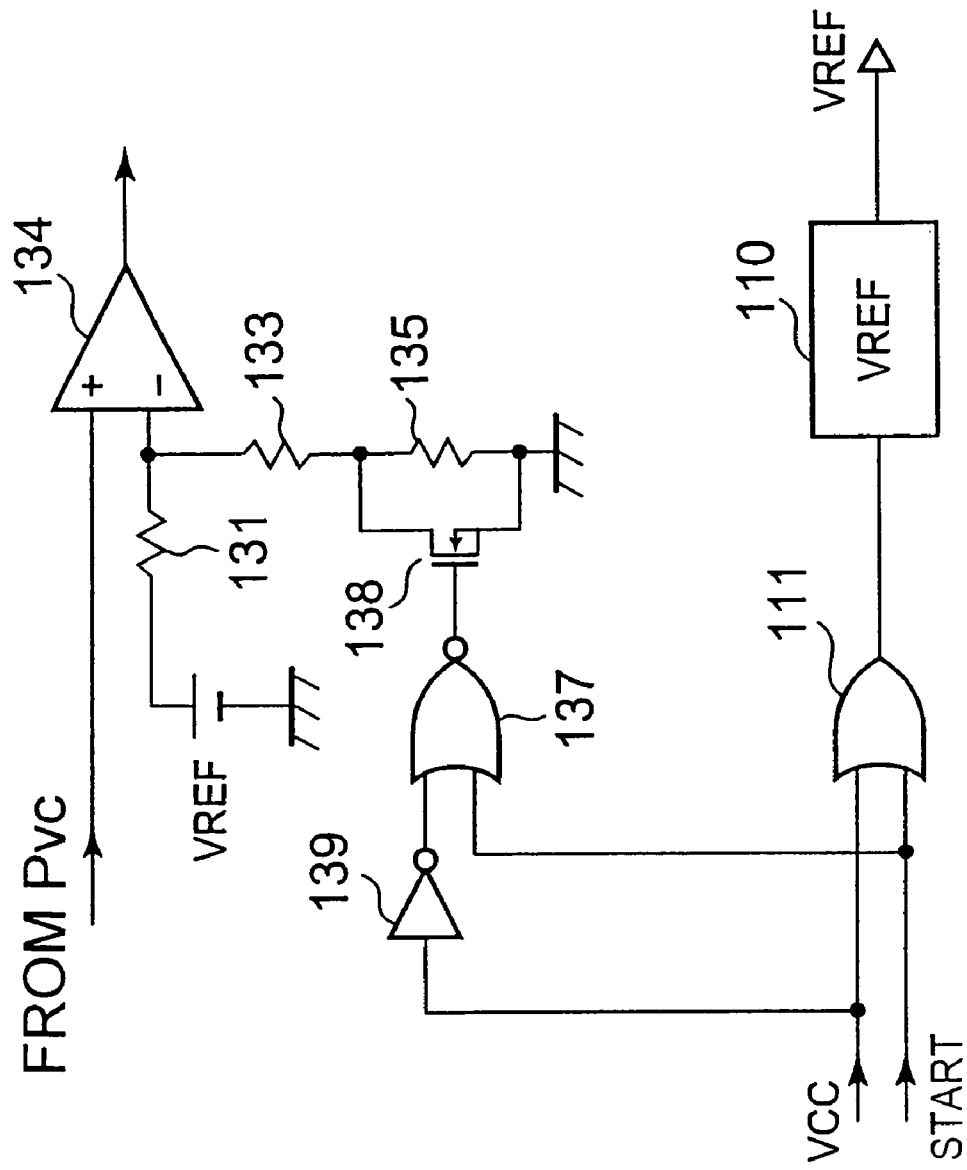
FIG. 8 shows an arrangement of a pre-charging circuit according to a sixth embodiment of the invention.

Referring to FIG. 8, there is shown an arrangement of a pre-charging circuit for pre-charging the capacitor 216 in accordance with a sixth embodiment of the invention. This pre-charging circuit starts charging the capacitor 216, without waiting for a start charging signal START from the CPU 400, when the control voltage VCC is applied to the capacitor charging apparatus. In this case, the predetermined full-charge detection level is reduced by a predetermined factor so that the capacitor is pre-charged to a certain voltage lower than the full-charge voltage.

As seen in FIG. 8, the reference voltage generating circuit 110 is put in operation to generate the reference voltage VREF when either one of the control voltage VCC and the start charging signal START is supplied thereto. This can be done by means of, for example, an OR circuit 111.

The predetermined full-charge detection level may be obtained from the reference voltage VREF using a resistor 131 and a voltage dividing circuit consisting of resistors 133 and 135. Connected in parallel to the resistor 135 is a switch 138 in the form of an NMOS transistor, which is turned on upon receipt of the control voltage VCC when the start charging signal START is low (L), but turned off upon receipt of the control voltage VCC when the start charging signal START is high (H).

As a consequence, the full-charge detection level during pre-charging is set to a lower level as compared to the initial level at the time the start charging signal START was supplied. This can be attained by a logic circuit formed of, for example, a NOT circuit 139 receiving the control voltage VCC and a NOR circuit 137 receiving the output of the NOT circuit 139 and a start charging signal START.

When the capacitor is pre-charged in advance to a predetermined voltage lower than the full charging voltage, the time for full charging of the capacitor subsequent to the receipt of an external start charging signal can be appreciably shortened.

What we claim is:

1. A capacitor charging apparatus, including a primary circuit receiving a power supply voltage and including a switch means adapted to turn on in response to a switch drive signal and connected in series with a primary winding of a transformer, said transformer having a secondary winding connectable to a capacitor to be charged, said apparatus comprising:

primary current detection means for detecting a primary current detection signal generated in association with the primary current flowing through said primary winding when said switch means is turned on in response to said switch drive signal;

a primary current peak detection circuit adapted to generate a primary current peak detection signal for stopping said switch drive signal to turn off said switch means when said primary current detection signal has reached a predetermined peak detection level;

a voltage dividing circuit arranged to generate a first voltage obtained by dividing a charging voltage across said capacitor;

an off-time detection circuit adapted to start clocking an off-time of said primary circuit in response to the stopping of said switch drive signal corresponding to said primary current peak detection signal, and generate said switch drive signal when finishing clocking said off-time, thereby then turning on said switch means, said off-time detection circuit is arranged to receive said first voltage, and said off-time is shortened as said charging voltage increases; and a full-charge detection circuit arranged to receive said first voltage and output a full-charge detection signal when said first voltage exceeds a predetermined fully charged voltage, to thereby stop said switch drive signal and inform external devices that said capacitor is fully charged.

2. The capacitor charging apparatus according to claim 1, wherein said off-time detection circuit includes an off-time adjusting resistor having a prescribed yet alterable resistance that determines the magnitude of the current flowing therethrough under said first voltage.

3. The capacitor charging apparatus according to claim 1, wherein said off-time detection circuit is fed a further predetermined voltage to determine the length of said offset-time based on the higher one of said first voltage and a second voltage associated with said further predetermined voltage.

4. The capacitor charging apparatus according to claim 3, wherein said off-time detection circuit includes an off-time adjusting resistor having a prescribed yet alterable resistance that determines the magnitude of current flowing therethrough under the higher one of said first and second voltages.

5. The capacitor charging apparatus according to claim 1 or claim 3, wherein said off-time detection circuit includes a voltage limiting circuit for limiting said first voltage to a predetermined voltage.

6. The capacitor charging apparatus according to claim 1 or claim 3, further comprising: secondary-current detection means for detecting the level of the secondary current that flows through said secondary winding; and a secondary-current level detection circuit for detecting said secondary current falling below a predetermined secondary current detection level, whereby said off-time is terminated based on the detection signal detected first of the detection signals sent from the secondary-current level detection circuit and from said off-time detection circuit.

7. The capacitor charging apparatus according to claim 1, wherein said predetermined peak detection level is the voltage associated with the power supply voltage, and said primary current peak detection circuit is adapted to alter said primary current peak level in accord with the power supply voltage.

8. The capacitor charging apparatus according to claim 1, further comprising:
a reference voltage generating circuit arranged to operate when one of a control voltage for controlling said capacitor charging apparatus and a start charging signal is fed thereto, wherein
said full-charge detection circuit comprises:
a comparator comparing the first voltage with the predetermined fully charged voltage;
a plurality of resistors arranged to divide a voltage outputted from said reference voltage generating circuit to generate said predetermined fully charged voltage; and
a transistor connected in series with one of said plurality of resistors; wherein
said transistor is turned on and off according to an availability of said control voltage and a logic level of said charging signal; and
said predetermined fully charged voltage is variable according to turning-on or turning-off said transistor.

9. The capacitor charging apparatus according to claim 8, wherein
said transistor is turned on when said control voltage is fed thereto and said start charging signal has a logic level indicative of stopping charging, and is turned off when said start charging signal has a logic level indicative of starting the charging; and
said predetermined fully charged voltage has a first voltage level when said transistor is on, and has a second voltage level higher than the first voltage level when said transistor is off.

10. The capacitor charging apparatus according to claim 1, further comprising an over-voltage detection circuit adapted to receive an input voltage associated with the primary voltage across said primary winding and generate an over-voltage detection signal to stop said switch drive signal when said input voltage exceeds a predetermined over-voltage detection level.

11. The capacitor charging apparatus according to claim 10, further comprising:
a start switch adapted to be turned on by a charging start signal, and arranged to start charging said capacitor; wherein
said input voltage is supplied to start said over-voltage detection circuit in accordance with the turning on of the start switch.

12. The capacitor charging apparatus according to claim 1, further comprising:
a coefficient unit arranged to receive a reference divided voltage by dividing a reference voltage generated in accordance with a charging start signal arranged to start charging said capacitor, and arranged to generate said predetermined peak detection level by coefficient-multiplying said reference-divided voltage.

13. A semiconductor integrated circuit (IC) for use in a capacitor charging apparatus that includes a primary circuit receiving a power supply voltage and consisting of a switch means adapted to turn on in response to a switch drive signal and connected in series with a primary winding of a transformer, said transformer having a secondary winding connectable to a capacitor to be charged, said semiconductor IC comprising:
a primary current peak detection circuit receiving a primary current detection signal generated in associated with the primary current flowing through said primary winding when said switch means is turned on by a switch drive signal generated, said primary current peak detection circuit adapted to generate a primary current peak detection signal for stopping said switch drive signal to turn off said switch means when said primary current detection signal has reached a predetermined peak detection level;
a voltage dividing circuit arranged to generate a first voltage obtained by dividing a charging voltage across said capacitor;
an off-time detection circuit adapted to start clocking an off-time of said primary circuit in response to the stopping of said switch drive signal corresponding to said primary current peak detection signal, and generate said switch drive signal when finishing clocking said off-time, thereby then turning on said switch means, said off-time detection circuit is arranged to receive said first voltage, and said off-time is shortened as said charging voltage increases; and
a full-charge detection circuit arranged to receive said first voltage and output a full-charge detection signal when said full voltage exceeds a predetermined fully charged voltage, to thereby stop said switch drive signal and inform external devices that said capacitor is fully charged.

14. The semiconductor IC according to claim 13, wherein said off-time detection circuit includes an off-time adjusting resistor having a prescribed yet alterable resistance that determines the magnitude of the current flowing therethrough under said first voltage.

15. The semiconductor IC according to claim 13, wherein said off-time detection circuit is fed a further predetermined voltage to determine the length of said off-time based on the higher one of said first voltage and a second voltage associated with said further predetermined voltage.

16. The semiconductor IC according to claim 15, wherein said off-time detection circuit includes an off-time adjusting resistor having a prescribed yet alterable resistance that determines the magnitude of current flowing therethrough under the higher one of said first and second voltages.

17. The semiconductor IC according to claim 13 or claim 15, wherein said off-time detection circuit includes a voltage limiting circuit for limiting said first voltage to a predetermined voltage.

18. The semiconductor IC according to claim 13 or claim 15, further comprising: secondary-current level circuit adapted to receive a secondary-current detection signal indicative of the level of the secondary current flowing through said secondary winding and detect said secondary current falling below a predetermined secondary current detection level, whereby said off-time is terminated based on the detection signal detected first of the detection signals sent from the secondary-current level detection circuit and from said off-time detection circuit.

19. The semiconductor IC according to claim 13, wherein said predetermined peak detection level is the voltage associated with the power supply voltage, and said primary current peak detection circuit is adapted to alter said primary current peak level in accord with the power supply voltage.

20. The semiconductor IC according to claim 13, further comprising:
a reference voltage generating circuit arranged to operate when one of a control voltage for controlling said capacitor charging apparatus and a start charging signal is fed thereto, wherein
said full-charge detection circuit comprises:
a comparator comparing the first voltage with the predetermined fully charged voltage;
a plurality of resistors arranged to divide a voltage outputted from said reference voltage generating circuit to generate said predetermined fully charged voltage; and
a transistor connected in series with one of said plurality of resistors; wherein
said transistor is turned on and off according to an availability of said control voltage and a logic level of said charging signal; and
said predetermined fully charged voltage is variable according to turning-on or turning-off said transistor.

21. The capacitor charging apparatus according to claim 20, wherein
said transistor is turned on when said control voltage is fed thereto and said start charging signal has a logic level indicative of stopping charging, and is turned off when said start charging signal has a logic level indicative of starting the charging; and
said predetermined fully charged voltage has a first voltage level when said transistor is on, and has a second voltage level when said transistor is off.

22. The semiconductor IC according to claim 13, further comprising an over-voltage detection circuit adapted to receive an input voltage associated with the primary voltage across said primary winding and generate an over-voltage detection signal to stop said switch drive signal when said voltage exceeds a predetermined over-voltage detection level.

23. The semiconductor IC according to claim 22, further comprising:
a start switch adapted to be turned on by a charging start signal, and arranged to start charging said capacitor; wherein
said input voltage is supplied to start said over-voltage detection circuit in accordance with the turning on of the start switch.

24. The semiconductor integrated circuit (IC) according to claim 13, further comprising:
a coefficient unit arranged to receive a reference divided voltage by dividing a reference voltage generated in accordance with a charging start signal arranged to start charging said capacitor, and arranged to generate said predetermined peak detection level by coefficient-multiplying said reference-divided voltage.

25. A capacitor charging-discharging system, comprising:
a capacitor;
a capacitor charging apparatus according to claim 1;
a strobe apparatus for emitting light by discharging said capacitor; and
a controller for monitoring and controlling said capacitor charging apparatus and strobe apparatus.

26. A capacitor charging apparatus, including a primary circuit receiving a power supply voltage and including a switch device adapted to turn on in response to a switch drive signal and connected in series with a primary winding of a transformer, said transformer having a secondary winding connectable to a capacitor to be charged, said apparatus comprising:
a primary current detection circuit for detecting a primary current detection signal generated in association with the primary current flowing through said primary winding when said switch device is turned on in response to said switch drive signal;
a primary current peak detection circuit adapted to generate a primary current peak detection signal for stopping said switch drive signal to turn off said switch device when said primary current detection signal has reached a predetermined peak detection level;
a voltage dividing circuit arranged to generate a first voltage obtained by dividing a charging voltage across the capacitor;
an off-time detection circuit adapted to start clocking an off-time of said primary circuit in response to the stopping of said switch drive signal corresponding to said primary current peak detection signal, and generate said switch drive signal when finishing clocking said off-time, thereby then turning on said switch device, said off-time detection circuit is arranged to receive said first voltage, and said off-time is shortened as said charging voltage increases; and
a full-charge detection circuit arranged to receive said first voltage and output a full-charge detection signal when said first voltage exceeds a predetermined fully charged voltage, to thereby stop said switch drive signal and inform external devices that said capacitor is fully charged.

27. A semiconductor integrated circuit for use in a capacitor charging apparatus that includes a primary circuit receiving a power supply voltage and including a switch device adapted to turn on in response to a switch drive signal and connected in series with a primary winding of a transformer, said transformer having a secondary winding connectable to a capacitor to be charged, said semiconductor integrated circuit comprising:
a primary current peak detection circuit receiving a primary current detection signal generated in associated with the primary current flowing through said primary winding when said switch device is turned on by a switch drive signal generated, said primary current peak detection circuit adapted to generate a primary current peak detection signal for stopping said switch drive signal to turn off said switch device when said primary current detection signal has reached a predetermined peak detection level;
a voltage dividing circuit arranged to generate a first voltage obtained by dividing a charging voltage across the capacitor;
an off-time detection circuit adapted to start clocking an off-time of said primary circuit in response to the stopping of said switch drive signal corresponding to said primary current peak detection signal, and generate said switch drive signal when finishing clocking said off-time, thereby then turning on said switch device, said off-time detection circuit is arranged to receive said first voltage, and said off-time is shortened as said charging voltage increases; and a full-charge detection circuit arranged to receive said first voltage and output a full-charge detection signal when said first voltage exceeds a predetermined fully charged voltage, to thereby stop said switch drive signal and inform external devices that said capacitor is fully charged.

* * * * *